Patented June 27, 1939

2,163,636

UNITED STATES PATENT OFFICE 2,163,636

PROCESS FOR PREPARING LINEAR CONDENSATION POLYAMIDES

Edgar William Spanagel, Wilmington, Del., assignor to E. I. du Pont de Nemours & Company, Wilmington, Del., a corporation of Delaware No Drawing. Application August 20, 1937, Serial No. 160,191

20 Claims. (Cl. 260—561)

This invention relates to polymeric materials and more particularly to polyamides and improvements in their preparation.

The polyamides with which this invention is concerned are disclosed in U. S. Patent 2,071,250. These polyamides are obtained by heating bifunctional amide-forming reactants under condensation polymerization conditions until the products have a sufficiently high molecular weight to exhibit fiber-forming properties. These synthetic linear condensation polyamides are of two types: those derived from monoaminomonocarboxylic acids or their amide-forming derivatives, and those derived from the reaction of suitable diamines with suitable dicarboxylic acids or amide-forming derivatives of dibasic carboxylic acids. The first type of polyamide is described in some detail in U. S. Patent 2,071,253, the second in copending application Serial Number 136,031, filed April 9, 1937 by W. H. Carothers. Properties of the polyamides which contribute to their high quality as fiber-forming materials are high melting point, insensitivty to most solvents and chemcal reagents, great strength, and good elasticity.

An object of this invention is to provide an improved method for the preparation of polyamides, particularly synthetic linear condensation polyamides. Another object is to provide effective heat transfer throughout the reaction mass in the large scale production of polyamides. A further object is to provide a method for the large scale manufacture of fiber-forming synthetic linear condensation polyamides of good quality without the use of an organic solvent or mechanical agitation. Other objects will become apparent as the description proceeds.

These objects are attained by adding sufficient water to the polyamide-forming reactants to render the mass fluid before it reaches polymerizing temperatures, heating the mass in a closed vessel at polyamide-forming temperatures until the major portion of the reactants has reacted to form polyamide, and then continuing the polymerization with removal of water until a polymer of the desired properties is obtained. In its preferred embodiment, these objects are accomplished by heating a diamine and a dicarboxylic acid in the presence of sufficient water to render the reaction mass fluid before it reaches polyamide-forming temperatures, heating the mass to and maintaining it at polyamide-forming temperatures until the major portion of the reactants has combined to form low molecular weight polyamide, removing the water as steam at a sufficiently high temperature to keep the polyamide fluid, and continuing the polymerization until a fiber-forming polyamide of good quality is obtained.

One practice described in the above mentioned applications involves the preparation of the fiber-forming polyamides in the presence of diluents which may be solvents for the polyamides such as phenol and cresol or non-solvents such as mineral oil. The use of water as a diluent is not disclosed. As a matter of fact, water cannot be used as a diluent in the preparation of fiber-forming polyamides according to the manner described for the diluents previously mentioned, i. e., leaving the diluent in the reaction mass throughout the entire reaction. Water cannot be left in the reaction mass in any appreciable amount because it prevents condensation of the reactants beyond the low molecular weight or non-fiber-forming stage. Another practice described is to conduct the first stage of the reaction in a closed vessel without added water but with retention of water of reaction to produce a low molecular weight or non-fiber-forming polyamide and then to heat this product under conditions permitting escape of the water of reaction until a high molecular weight or fiber-forming polyamide is formed. The amount of water formed in this way as a consequence of the reaction is insufficient in large scale production to accomplish the objects of this invention and bring about the advantages referred to hereinafter.

Still another process involving the use of water in the preparation of polyamides is found in application Serial Number 113,723, filed December 1, 1936 by W. H. Carothers and G. D. Graves, wherein equimolecular weights of the polyamide-forming reactants are mixed in aqueous medium which is removed by distillation followed by heating the reactants thus separated from the medium until a fiber-forming polyamide is obtained. The present invention, on the other hand, involves the heating of the reactants in the presence of a substantial amount of added water under polymerizing conditions until a low molecular weight polymer is formed, removing the water, preferably at a temperature sufficiently high to keep the polyamide fluid, and then continuing the polymerization until a fiber-forming polyamide is produced.

The distinctions just mentioned between the process of this invention and those of the prior practice referred to above will be apparent by considering problems involved in the commercial manufacture of the fiber-forming polyamides. Thus, while the previously used methods all yield fiber-forming products, they are not particularly well adapted to large scale production for the following reasons: If, in the preparation of a polyamide of the diamine-dibasic acid type, the dry diamine-dicarboxylic acid mixture or the corresponding salt is heated in a large vessel, with or without the addition of a viscosity stabilizer, reaction occurs before the mixture is completely molten, for the heat transfer through a mass of the dry reactant is very poor and the reaction proceeds at a substantial rate at the melting point of the solid reactants. The time required to melt a large mass of reactant is so long that the portion which melts first undergoes considerable reaction before the last portion melts. As a result thorough mixing does not occur and a non-uniform product is obtained. While mechanical agitation is of some assistance here, the use of an agitator adds very materially to the cost and complexity of the equipment and makes it difficult to prevent impurities from entering the reaction mixture via the agitator bearing. Moreover, heat loss through the large agitator shaft is sometimes sufficient to cause polymer to solidify on the agitator.

Heating the polyamide-forming reactant or reactants in a closed system so that the water formed in the reaction is retained is also unsatisfactory because, although this method lowers the melting point of the resultant polymeric mass somewhat, there is no water present when the reaction starts and so little present early in the reaction that when operating on a large scale, the mixture is not fluid. As already indicated, this method leads to a heterogeneous product. This procedure therefore does not eliminate the necessity for mechanical stirring; and even when such mixtures are stirred, some of the mass collects and adheres to the top of the stirrer, thus leading to a heterogeneous product. The addition of polyamide solvents, e. g., phenols, to the reaction mixture tends to obviate this difficulty but this method of preparation involves the additional step of eliminating the solvent. This removal of the solvent is a costly operation particularly in the case of high boiling solvents, such as the phenols. In this method of preparation it is still necessary to provide for the removal of the water during the last stages of the reaction.

Polyamides of good quality and in large scale amounts can be obtained with avoidance of the disadvantages mentioned above through the practice of this invention which comprises heating polyamide-forming reactants at polyamide-forming temperatures in the presence of added water, preferably from 5 to 50% based on the total weight of water and polyamide-forming reactants, under such conditions that the mass is fluid when it reaches polyamide-forming temperatures and remains fluid at reaction temperatures, removing the water as steam after the major portion of the polyamide-forming reactants has combined to form a polyamide, and then continuing the polymerization under conditions permitting the escape of the additional water formed in the reaction until a product of the desired properties is obtained, that is, until the resulting polyamide is capable of being drawn into useful pliable fibers showing upon X-ray examination the molecular orientation characteristic of natural fibers.

The process of this invention will be described with particular reference to the preparation of polyamides from diamines and dicarboxylic acids since this forms the preferred embodiment of the invention. It will be apparent in the case of these reactants that the present process, whether the diamine and dicarboxylic acid are added as such or in the form of their salt, involves in its initial steps the continued heating of an initial diamine-dicarboxylic acid reaction product until the polymerization has proceeded substantially as far as is possible in the presence of the water. The amount of water used should be sufficient to render the reaction mixture fluid before appreciable polyamide-formation occurs. In other words, the reaction mixture should be fluid when it reaches 160° C., and preferably when it reaches 120° C.

The polyamide-forming reactants used in this invention as before observed, may be a polymerizable amino acid wherein the molecules of the acid condense with each other, or they may consist, as is preferred, of a diamine and dicarboxylic acid, or of the salt formed therefrom. As has been disclosed in the above mentioned cases and as will be understood by those skilled in the art, the amide-forming derivative of the amino acid or of the dicarboxylic acid may be used instead of the free acids themselves. The reference to amino acids and the dicarboxylic acids for the purpose of this invention means also the amide-forming derivatives of these acids.

When a diamine and a dicarboxylic acid or a salt thereof are mixed with water so as to form a solution or slurry and this mixture is heated in a closed system, e. g., an autoclave, at polyamide-forming temperatures, usually above 160° C., and preferably between 180–250° C., the mixture forms a thin homogeneous solution which conducts heat very readily. In the process of this invention this solution is heated in a closed system, or at least under such conditions that a sufficient amount of water is retained to keep the reaction mixture fluid, until most of the diamine and dicarboxylic acid have reacted to form polyamide. The time required for this purpose will of course depend upon the temperature used at 180° C., as much as 6 hours may be required, whereas at 250° C., 0.5 hour is usually sufficient. If the water is removed before most of the reactants have combined, considerable amounts of the reactants, particularly the diamine in the case of diamine-dibasic acid mixtures, distills out with the water. In the process of this invention the reaction mixture undergoes thorough automatic agitation since the water present is continuously boiling and recondensing. No mechanical agitation is necessary therefore. This, as has been mentioned, is an important factor because agitators involve considerable additional cost, particularly when operating with corrosive materials, and present the problem of providing a suitable seal or pack which will prevent contamination of the product.

To illustrate the effect of the added water in this invention in lowering the melting point of polyamides the following data are presented for polyhexamethylene adipamide which melts at about 263° C., under oxygen-free conditions. This means that if hexamethylenediamine and adipic acid or the corresponding salt are heated at polyamide-forming temperature under conditions permitting the escape of the water formed in the reaction, the temperature must be kept above 263° C., in order to keep the mass in the molten state and even then the mass will be very viscous. On the other hand, if 5% of water is added to the reactants and the heating is conducted in a closed system so that the major portion of the water is retained in the liquid phase, the reaction mixture becomes fluid at a temperature considerably below 200° and remains quite fluid at 200° C. In practice, however, it is advantageous to use more than 5% of water in preparing polyhexamethylene adipamide, preferably enough water to completely dissolve the reactants when the temperature reaches 120° C. Thirty per cent of water based on the total weight of water and polyamide-forming reactants works very satisfactorily. The capacity of the reaction vessel selected should not of course be so large that all the water used will be in the vapor phase at polyamide-forming temperatures. The capacity of the reaction vessel should preferably be less than four times the volume of the original reaction mass.

It is very surprising that water, which appears to have no solvent action whatsoever on polyamides under ordinary conditions should form a solution with polyamides at elevated temperatures under pressure. Furthermore, although water at this elevated temperature tends to hydrolyze polyamides, the equilibrium is such that over 90%, and usually over 95%, of the polyamide-forming groups in the reactants have reacted even at temperatures as high as 250° C. Almost no monomer is present for the unreacted polyamide-forming groups are for the most part found at the ends of polymer chains. The polymer formed under these conditions, however, has a low molecular weight and will be referred to herein as "half made" polymer. The half made polymer does not exhibit fiber-forming properties or at best exhibits only very weak fiber-forming properties. The intrinsic viscosities of half made polymers are below 0.4 and usually in the neighborhood of 0.15 to 0.35 depending upon the reaction conditions, particularly the temperature and amount of water used. The final high molecular weight fiber-forming polyamides, on the other hand, have intrinsic viscosities above 0.4, and preferably between 0.6 and 2.0. Intrinsic viscosity is defined as $$\frac{\log_e \eta r}{C}$$

where $\eta r$ is the viscosity of a dilute m-cresol solution of the polyamide divided by the viscosity of m-cresol in the same units and at the same temperature and C is the concentration of the polyamide in grams per 100 cc. of solution.

As already indicated, the half made polymer can be prepared in a closed system so that all the water added, as well as that formed in the reaction, is retained. The reaction can also be carried out with essentially the same results by allowing the pressure (and temperature) to build up to a point which will insure the retention of sufficient water to keep the mass fluid and then maintaining this pressure with increase in temperature by allowing water to escape as steam. This procedure is described in Examples I and II.

The conversion of half made polymer to fiber-forming polymer is most conveniently carried out in the same reaction vessel in which the half-made polymer is prepared. The conversion is readily accomplished by removing the water from the reaction mixture at a temperature sufficiently high to keep the reaction mass fluid, and then heating the reaction mass under conditions permitting the escape of any additional water formed in the reaction until a product of the desired intrinsic viscosity is obtained. Since a "viscosity stabilizer" is generally added to the original reactants, the polymerization reaction will be carried out essentially to completion, i. e., until a viscosity stable product is obtained. The ultimate viscosity will of course depend upon the quantity of the stabilizer used. Before removing the polymer from the reaction vessel, it is desirable to evacuate the system.

The "viscosity stabilizer" referred to above is a compound added to the reactants to insure the formation of a polyamide which does not alter appreciably in viscosity on further heating at melt spinning temperatures. The viscosity stabilizer will usually consist of an excess of one of the polyamide-forming reactants and/or of a monofunctional amide-forming reactant, such as a monocarboxylic acid or a monoamine. The stabilizer functions by virtue of the fact that it unbalances the amide-acid equivalency so that polymerization proceeds until a certain molecular weight (viscosity) is reached and then practically ceases. The point at which polymerization ceases is dependent upon the amount of stabilizer used.

At elevated temperatures and particularly in the molten state, the polyamides are readily oxidized. It is important therefore that oxygen be excluded during their preparation. This can be done by blanketing the reaction mixture with an inert gas, e. g., oxygen-free nitrogen, carbon dioxide, or hydrogen. The water vapor first formed in the process of this invention can also be used to sweep oxygen from the reaction vessel. In fact, the best results are obtained in this invention when water vapor is essentially the only gaseous medium above the reaction mass, since this is conducive to good agitation. The process of this invention is described more specifically in the following examples:

EXAMPLE I

A mixture of 57.8 pounds of hexamethylene diammonium adipate, the salt derived from hexamethylenediamine and adipic acid, 0.35 pound of adipic acid, 0.30 pound of hexamethylene diammonium acetate, and 24.7 pounds (30%) of distilled water was charged into a 10-gallon stainless steel autoclave. The autoclave was purged with oxygen-free nitrogen to remove substantially the last traces of air and was then sealed. The autoclave was heated by means of a vapor bath (temperature of vapor about 290° C.). The reaction mixture was completely fluid before its temperature reached 100° C. After 2.5 hours' heating, the pressure in the autoclave reached 250 pounds per square inch, the temperature of the reaction mass at this point being 210° C. The heating was continued but the pressure was maintained at 250 pounds by permitting steam to escape through a condenser until the temperature of the reaction mass reached 265° C. which is just above the melting point of the dry polyamide. The pressure was then slowly reduced to atmospheric and the reaction mass heated at 280° C., for about 1.5 hours. During the last 0.25 hour of the preparation cycle, the autoclave was slowly evacuated to a vacuum of 20 inches of mercury and held at this low pressure for about five minutes to remove any gas present in the molten polymer. The molten polymer was then discharged from the autoclave. The product had an intrinsic viscosity of 0.82 and exhibited excellent fiber-forming properties.

Example II

A mixture of 1,048 parts by weight of hexamethylene diammonium adipate, 3.45 parts by weight of adipic acid, 3.31 parts by weight of hexamethylene diammonium acetate, and 187 parts by weight (15%) of water was charged into a stainless steel autoclave. After purging the autoclave with oxygen-free nitrogen, it was sealed and heated at 225° C. for two hours. The maximum pressure developed was 255 pounds per square inch. (Analysis of a test sample of the polymer at this stage showed that it had an intrinsic viscosity of 0.27.) The heating was then continued with increase in temperature but the pressure was kept at 255 pounds by allowing steam to escape. When the temperature reached 270° C. the pressure was slowly reduced to atmospheric pressure. Heating was continued at this temperature for two hours under conditions permitting the escape of any further water formed in the reaction. The resultant polyamide had an intrinsic viscosity of about 0.9 and exhibited good fiber-forming qualities.

Example III

A reaction mixture identical with that described in Example I was heated in a closed vessel until the temperature of the mass reached 270° C. This required about two hours, the pressure developed in the vessel being about 700 pounds per square inch. The pressure was then reduced to atmospheric pressure without allowing the temperature of the reaction mass to fall below 270° C., by permitting the steam to escape slowly. The heating was then continued at 270–275° C. under atmospheric pressure for one hour. This gave a fiber-forming polyamide having an intrinsic viscosity of 0.85.

The foregoing examples describing the application of this invention to the preparation of hexamethylene adipamide are not to be considered as limitative. Other diamines and dibasic acids or salts thereof may be employed in the process. A valuable class of reactants for use in this invention are diamines of formula $NH_2CH_2RCH_2NH_2$ and dicarboxylic acid of formula $HOOCCH_2R'CH_2COOH$ in which R and R' are divalent hydrocarbon radicals free from aliphatic unsaturation and in which R' has a chain length of at least two carbon atoms. Especially useful reactants within this group are those in which R is $(CH_2)_x$ and R' is $(CH_2)_y$ in which $x$ is at least 2 and $y$ is at least 1. Polyamides derived from reactants of this type yield filaments of excellent quality. Instead of using a single diamine and a single dicarboxylic acid, mixtures of diamines and/or dicarboxylic acids can be employed. In order to obtain a spinnable product the diamines and dicarboxylic acid should be used in substantially equimolecular proportions, that is, not more than about 5% excess of either reactant should be employed. As already indicated, a small excess of either reactant may be desirable in order to obtain viscosity stable products. Thus, in the Examples I–III a mixture of adipic acid and hexamethylene diammonium acetate is used as viscosity stabilizer.

The process herein described is also applicable to the preparation of polyamides of the amino acid type. Thus a polymerizable monoamino-monocarboxylic acid may be converted into a fiber-forming polymer by heating under the conditions described in the foregoing examples. The invention is also applicable to the preparation of polyamides from mixtures of amino acids with one another or with diamines and dicarboxylic acids.

Table I contains a representative list of polyamide-forming reactants which can be converted into useful polyamides by the process of this invention. The melting points of the resultant polyamides as given in the table were determined by heating fine particles of the polymer on a heated metal block and noting the temperature of fusion. Melting points as determined in a glass tube in the absence of air are usually from 5 to 20° higher. Thus the melting point of polyhexamethylene adipamide as determined in the absence of air is 263° C. as compared with 248° C. by the method used in compiling the data in Table I. All of the polyamides listed in this table are fiber-forming.

Table I

*Representative polyamide-forming reactants*

| Reactants | Polyamide M. P. °C. |
|---|---|
| Ethylenediamine and sebacic acid | 254 |
| Tetramethylenediamine and adipic acid | 278 |
| Tetramethylenediamine and suberic acid | 250 |
| Tetramethylenediamine and azelaic acid | 223 |
| Tetramethylenediamine and sebacic acid | 239 |
| Tetramethylenediamine and undecanedioic acid | 208 |
| Pentamethylenediamine and malonic acid | 191 |
| Pentamethylenediamine and glutaric acid | 196 |
| Pentamethylenediamine and adipic acid | 223 |
| Pentamethylenediamine and pimelic acid | 183 |
| Pentamethylenediamine and suberic acid | 202 |
| Pentamethylenediamine and octadecanedioic acid | 167 |
| Hexamethylenediamine and sebacic acid | 209 |
| Hexamethylenediamine and adipic acid | 248 |
| Hexamethylenediamine and beta-methyl adipic acid | 216 |
| Hexamethylenediamine and 1,2-cyclohexanediacetic acid | 236 |
| Hexamethylenediamine and diphenic acid | 157 |
| Hexamethylenediamine and diglycolic acid | 143 |
| Octamethylenediamine and adipic acid | 235 |
| Octamethylenediamine and sebacic acid | 197 |
| Decamethylenediamine and carbonic acid | 200 |
| Decamethylenediamine and oxalic acid | 229 |
| Decamethylenediamine and sebacic acid | 194 |
| Decamethylenediamine and para-phenylenediacetic acid | 242 |
| Decamethylenediamine and p,p'-diphenylolpropane diacetic acid | 105 |
| Para-xylylenediamine and sebacic acid | 268 |
| 3-methylhexamethylenediamine and adipic acid | 180 |
| Piperazine and sebacic acid | 153 |
| 3,3'-diaminopropyl ether and adipic acid | 190 |
| 6-aminocaproic acid | 203 |
| 9-aminononanoic acid | 195 |
| 11-aminoundecanoic acid | 180 |

It is within the scope of this invention to prepare polyamides containing various modifying agents, e. g., plasticizers, resins, antioxidants, pigments, dyes, oils, etc. Thus, by adding 1% of finely divided titanium dioxide to the reaction mixture of Example I, a fiber-forming product is obtained which yields filaments of very low lustre. In a similar fashion agents, such as diphenylolpropane and ortho-hydroxydiphenyl, can be added to the reaction mixture to lower the melting point of the resultant polyamide.

It is also within the scope of this invention to mix two or more half made polymers and heat them under conditions which will convert them into a fiber-forming product.

Although this invention has been described with particular reference to the preparation of fiber-forming polyamides, it is useful also in the preparation of non-fiber-forming products which may be used as ingredients in coatings, molding, or adhesive compositions. Such products are frequently useful in the half made stage, i. e., as polymerized in the presence of water.

This invention provides a simple and economical process for the large scale manufacture of polyamides. The process provides good heat transfer and thorough mixing of the polyamide reactants, and modifying agents, if present, without the use of mechanical agitation. No solvent recovery is necessary in the process since water is the only reaction medium employed and is discharged as steam during the course of the reaction. A further advantage of the process is that it provides a method for the preparation of low molecular weight, i. e., half made polymers which are useful for certain purposes, e. g., as adhesive and coating composition ingredients. By regulating the amount of water employed in the polymerization, it is possible to prepare products of varying degrees of polymerization.

As many apparently widely different embodiments of this invention may be made without departing from the spirit and scope thereof, it is to be understood that I do not limit myself to the specific embodiments thereof except as defined in the appended claims.

I claim:

1. A process for making polyamides which comprises heating polyamide-forming reactants at polymerizing temperatures and under superatmospheric pressure in the presence of added water in amount sufficient to render the reaction mass fluid during the polymerization reaction.

2. The process set forth in claim 1 in which said reactants comprise at least one diamine and at least one dicarboxylic acid.

3. A process for making polyamides which comprises heating polyamide-forming reactants capable of yielding fiber-forming polyamides in the presence of water in amount sufficient to render the mixture fluid before polymerization starts, heating the fluid mass at polyamide-forming temperature under superatmospheric pressure until further polymerization substantially ceases, removing water from the reaction mass in amount such that the polymerization of the polyamide can proceed upon further heat treatment, and then with heat treatment continuing the polymerization and removal of water until the polyamide is capable of being drawn into fibers showing upon X-ray examination orientation along the fiber axis.

4. In a process for making polyamides, the steps which comprise the continued heating at polyamide-forming temperatures under superatmospheric pressure of an initial diamine-dicarboxylic acid reaction product, in the presence of sufficient water to render the mass fluid before it reaches polymerizing temperatures, until a polyamide is formed which has an intrinsic viscosity between 0.15 and 0.4, removing water from the polyamide thus formed, and continuing the polymerization heat treatment under conditions permitting the escape of additional water formed until the resulting polyamide has an intrinsic viscosity above 0.5.

5. A process for the preparation of polyamides which comprises heating an aqueous solution of a diamine-dicarboxylic acid mixture capable of yielding a fiber-forming polyamide at polyamide-forming temperatures in a closed system until the major portion of the diamine and dicarboxylic acid have reacted to form polyamide, releasing pressure to permit the escape of water vapor, and continuing the heating at polyamide-forming temperatures with removal of water vapor until a polyamide having good fiber-forming properties is obtained.

6. A process for the preparation of polyamides which comprises heating approximately equimolecular amounts of a diamine of formula $NH_2CH_2RCH_2NH_2$ and a dicarboxylic acid of formula $HOOCCH_2R'CH_2COOH$, in the presence of sufficient water to render the mixture fluid before it reaches polyamide-forming temperatures, heating the fluid mass at polyamide-forming temperatures under superatmospheric pressure until the major portion of the diamine and dicarboxylic acid has combined to form polyamide, removing water from the reaction mass at a temperature sufficiently high to keep the mass fluid, and continuing the heating of the fluid mass at polymerizing temperatures until the resulting polyamide has good fiber-forming properties, R and R' in said formulae representing divalent hydrocarbon radicals free from aliphatic unsaturation and R having a chain length of at least two carbon atoms.

7. The process of claim 6 in which the amount of water used in the first stage of the reaction comprises from 5% to 50% of the weight of the reaction mass.

8. The process of claim 6 in which the temperature of heating is between 160° and 300° C.

9. The process of claim 6 in which the reaction is effected under substantially oxygen-free conditions.

10. The process of claim 6 in which the diamine is hexamethylenediamine and the dicarboxylic acid is adipic acid.

11. The process of claim 6 in which the diamine is hexamethylenediamine and the dicarboxylic acid is adipic acid and in which the amount of water used amounts to about 30% of the combined weight of hexamethylenediamine, adipic acid, and water.

12. The process set forth in claim 1 in which said heating is continued until further polymerization ceases.

13. A process for making polyamides which comprises heating polyamide-forming reactants at polyamide-forming temperatures and at superatmospheric pressure in the presence of water in amount sufficient to render the reaction mass fluid before polymerization starts, removing water from the reaction mass, and continuing the heating of the mass at polyamide-forming temperatures until the desired degree of polymerization is attained.

14. A process for making polyamides which comprises heating polyamide-forming reactants at polyamide-forming temperatures and at superatmospheric pressure in the presence of water in amount sufficient to render the reaction mass fluid before polymerization starts, removing water as steam from the reaction mass under conditions such that the mass will remain fluid, and continuing the heating of the fluid mass at polymerizing temperatures until the desired degree of polymerization is attained.

15. A process for making polyamides which comprises heating polyamide-forming reactants in the presence of water in amount sufficient to render the mixture fluid before polymerization starts, heating the fluid mass at polyamide-forming temperatures with retention of water until the major portion of the reactants has combined to form polyamide, removing water as steam from the reaction mass under conditions such that the mass will remain fluid, and continuing the heating of the fluid mass at polymerizing temperatures until the desired degree of polymerization is attained.

16. A process for making polyamides which comprises preparing a mixture containing substantially equimolecular proportions of a diamine of formula NH$_2$CH$_2$RCH$_2$NH$_2$ and a dicarboxylic acid of formula HOOCCH$_2$R'CH$_2$COOH and sufficient water to render the mixture fluid before it reaches 120° C., heating the mixture at polyamide-forming temperatures and under superatmospheric pressure until the major portion of the diamine and dicarboxylic acid has combined to form polyamide, removing water as steam from the reaction mass under conditions such that the mass will remain fluid, and continuing the heating of the fluid mass at polymerizing temperatures with removal of steam until the product exhibits good fiber-forming properties, R and R' in said formulae representing divalent hydrocarbon radicals free from aliphatic unsaturation and R having a chain length of at least two carbon atoms.

17. A process for making polyamides which comprises preparing a mixture containing a polyamide delusterant, substantially equimolecular proportions of a diamine of formula NH$_2$CH$_2$RCH$_2$NH$_2$ and a dicarboxylic acid of formula HOOCCH$_2$R'CH$_2$COOH, and sufficient water to render the mixture fluid before it reaches 120° C., heating the mixture at polyamide-forming temperatures and under superatmospheric pressure until the major portion of the diamine and dicarboxylic acid has combined to form polyamide, removing water as steam from the reaction mass under conditions such that the mass will remain fluid, and continuing the heating of the fluid mass at polymerizing temperatures with removal of steam until the product exhibits good fiber-forming properties, R and R' in said formulae representing divalent hydrocarbon radicals free from unsaturation and R having a chain length of at least two carbon atoms.

18. A process for making polyamides which comprises heating polyamide-forming reactants at polymerization temperatures and at superatmospheric pressure in the presence of water in amount sufficient to render the reaction mass fluid before polymerization starts, and so regulating the temperature, pressure and rate of removal of water as steam during the further heating at polymerization temperatures that the reaction mass remains fluid until polymerization reaches the desired stage.

19. A process for making polyamides which comprises heating a polyamide-forming composition in the presence of 5–50% by weight of water, heating the mixture with retention of water at polymerizing temperatures until the major portion of the composition has combined to form polyamide, and then continuing the polymerization with removal of water until a polymer of the desired properties is secured.

20. A process for the preparation of polyamides which comprises heating an aqueous solution of a polyamide-forming composition capable of yielding a fiber-forming polyamide in a closed system until the major portion of the composition has reacted to form polyamide, releasing pressure to permit the escape of water vapor, and continuing the heating at polyamide-forming temperatures with removal of water vapor until a polyamide having good fiber-forming properties is obtained.

EDGAR WILLIAM SPANAGEL.